United States Patent Office 3,014,953
Patented Dec. 26, 1961

3,014,953
METHOD OF PREPARING PHOSPHORUS ESTERS
Gail H. Birum and James L. Dever, Dayton, Ohio, assignors to Monsanto Chemical Company, St. Louis, Mo., a corporation of Delaware
No Drawing. Filed May 8, 1959, Ser. No. 811,789
6 Claims. (Cl. 260—461)

The present invention relates to organic compounds of phosphorus and more particularly provides a new and valuable method of preparing certain benzenoid oxo esters of phosphorus acids.

According to the invention, 1,2-diphenyl-2-oxoethyl phosphates or phosphonates are obtained by heating benzil with certain pentavalent phosphorus esters at a temperature of over 100° C. but less than 200° C., substantially according to the scheme:

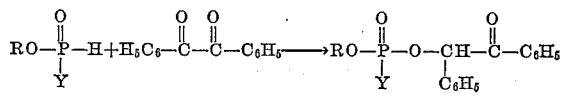

wherein R is selected from the class consisting of hydrocarbon and halohydrocarbon radicals which are free of aliphatic unsaturation and contain from 1 to 12 carbon atoms and Y is selected from the class consisting of R and —OR.

Pentavalent phosphorus esters useful for the present purpose are either dibasic phosphonates, i.e., compounds of the formula

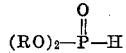

wherein R is as above defined, or monobasic hydrocarbyl- or halohydrocarbyl phosphinates of the formula

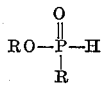

wherein R is as above defined.

Dibasic phosphonates useful for the present purpose are the simple dihydrocarbyl phosphonates such as dimethyl, diethyl, diisopropyl, di-n-propyl, di-n-butyl, dibenzyl, diisobutyl, di-n-amyl, di-n-hexyl, di-n-heptyl, di-p-tolyl, di-n-octyl, diphenyl, bis(2-ethylhexyl), dicyclohexyl, di-tert-nonyl, di-n-decyl, bis(2-phenylethyl), di-undecyl, di-β-naphthyl, di-n-dodecyl, bis(4-ethylphenyl), di-tert-dodecyl, and bis(2-butyloctyl) phosphonate; the mixed dihydrocarbyl phosphonates such as methyl n-propyl, n-amyl phenyl, benzyl ethyl, n-dodecyl isopropyl, 2-ethylhexyl o-tolyl and cyclopentyl methyl phosphonate; the simple halohydrocarbyl phosphonates such as bis(2-chloroethyl), bis(2-iodophenyl), bis(2-fluoroethyl), bis(2,4-dichlorophenyl), bis(dichlorooctyl), bis(4-iodocyclohexyl), bis(4-chlorobenzyl), bis(2-bromo-2-chloroethyl) and bis(trichlorododecyl) phosphonate; the mixed halohydrocarbyl phosphonates such as 2-chloroethyl 3-chlorophenyl phosphonate, 3,3-difluoropropyl tetrachlorobenzyl phosphonate, 2-chloroethyl p-tolyl phosphonate or ethyl 3-fluoropropyl phosphonate.

Presently useful hydrocarbylphosphinates or halohydrocarbylphosphinates, include, e.g., methyl phenylphosphinate,
ethyl α-naphthylphosphinate,
phenyl 2-fluoroethylphosphinate,
n-propyl methylphosphinate,
n-butyl benzylphosphinate,
n-amyl p-tolylphosphinate,
isopropyl cyclohexylphosphinate,
2-ethylhexyl 2,4-diethylphenylphosphinate,
phenyl n-hexylphosphinate,
ethyl 2,3-dichlorophenylphosphinate,
biphenyl n-butylphosphinate,
2-butyloctyl n-propylphosphinate,
methyl α-chlorobenzylphosphinate,
cyclohexyl p-biphenylphosphinate,
undecyl n-hexylphosphinate,
phenyl tetrachlorobutylphosphinate,
n-hexyl 2-methylcyclopentylphosphinate,
ethyl 4-n-hexylphenylphosphinate,
benzyl 2-phenylethylphosphinate,
n-dodecyl 2-ethylhexylphosphinate,
2-chloroethyl phenylphosphinate,
tetrachloropentyl ethylphosphinate,
3-bromopropyl n-hexylphosphinate,
2-bromopropyl β-bromo-α-naphthylbenzylphosphinate,
n-octyl 4-iodophenylphosphinate,
trichlorooctyl cyclohexylphosphinate,
4-fluorobutyl α-naphthylphosphinate,
4-chlorophenyl ethylphosphinate,
2,5-dichlorocyclohexyl phenylphosphinate,
2-chlorobenzyl n-butylphosphinate, etc.

The alkyl radical of either dialkyl, alkyl, aryl or alkyl halohydrocarbyl phosphonates or the alkyl hydrocarbylphosphinates or halohydrocarbylphosphinates may also be one derived from a branched chain alcohol obtained according to the "Oxo" process by the reaction of carbon monoxide and hydrogen with a higher olefin, e.g., butylene dimer or propylene trimer.

Reaction of the dibasic phosphonates with benzil proceeds according to the scheme:

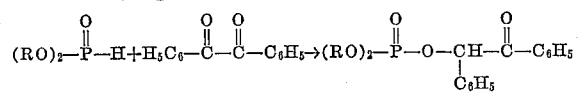

wherein R is selected from the class consisting of hydrocarbyl and halohydrocarbyl radicals which are free of aliphatic unsaturation and which contain from 1 to 12 carbon atoms. The products are dihydrocarbyl, bis(halohydrocarbyl) or hydrocarbyl halohydrocarbyl 1,2-diphenyl-2-oxoethyl phosphate. Thus, reaction of diethyl phosphonate and benzil gives diethyl 1,2-diphenyl-2-oxoethyl phosphate, i.e., a compound in which both R's of the above formula are ethyl radicals. Other phosphates provided by the invention are, e.g., the simple dialkyl 1,2-diphenyl-2-oxoethyl phosphates such as dimethyl, di-n-propyl, diisopropyl, di-n-butyl, di-tert-butyl, di-n-pentyl, diisopentyl, di-n-hexyl, di-n-heptyl, di-n-octyl, bis(2-ethylhexyl), di-tert-nonyl (wherein the nonyl radical is derived from "Oxo" process branched chain nonanol obtained by reaction of carbon monoxide, hydrogen and diisobutylene), di-tert-decyl (wherein the decyl radical is derived from branched chain decanol obtained like nonanol except that propylene trimer is used instead of diisobutylene), di-n-nonyl, di-n-decyl, di-n-undecyl, di-n-dodecyl and bis(2-butyloctyl) 1,2-diphenyl-2-oxoethyl phosphate; the simple bis(haloalkyl) esters such as the bis(2-chloroethyl), bis(2-chloropropyl), bis(3-chloropropyl), bis(2-fluoroethyl), bis(4-chlorobutyl), bis(2,2-dibromopropyl), bis(tetrachlorobutyl), bis(4,5-dichloropentyl), bis(iodohexyl), bis(chlorooctyl), bis(trichlorononyl), and bis(chlorododecyl) 1,2-diphenyl-2-oxoethyl phosphate; the mixed haloalkyl esters such as 2-chloroethyl butyl, 2-chloroethyl 2-bromoethyl, 2-chloropropyl propyl, dodecyl 3-iodopropyl, dodecyl 2-fluoroethyl, difluorobutyl octyl, or methyl tetrachlorohexyl 1,2-diphenyl-2-oxoethyl phosphate; the simple aromatic esters such as diphenyl, di-p-tolyl, di-β-naphthyl, di-4-biphenylyl, di-p-tolyl, bis(2-ethylphenyl), bis(4-hexylphenyl), dibenzyl, bis(2,4-dichlorobenzyl), bis(4-chlorophenyl), bis(2,4-dibromobenzyl), bis(α-iodo-β-naphthyl), bis(4-fluoro-2-butylphenyl), bis(3-phenylpropyl), bis(2-phenylethyl) or bis(4-pentylbenzyl) 1,2-diphenyl-2-oxoethyl phosphate;

the mixed aromatic esters such as benzyl phenyl, α-naphthyl phenyl, biphenylyl phenyl, 2-, 3- or 4-chlorophenyl phenyl, phenyl 2-, 3- or 4-tolyl, 2-, 3- or 4-ethylphenyl phenyl, 2- 3- or 4-chlorobenzyl phenyl, 2-, 3- or 4-chlorophenyl 2-phenylethyl, β-naphthyl 4-hexylphenyl, 4-fluorobiphenylyl biphenylyl, 2-phenylethyl β-napthyl, benzyl 2-, 3- or 4-chlorobenzyl, and 2,3-, 2,4-, 3,5- or 2,6-dichlorobenzyl phenyl 1,2-diphenyl-2-oxoethyl phosphate; the mixed aliphatic aromatic esters such as ethyl phenyl, methyl α-naphthyl, butyl phenyl, 2-, 3- or 4-chlorophenyl ethyl, benzyl 2-chloropropyl, n-octyl phenyl, 2-phenylethyl n-propyl, 2,3-dichlorophenyl n-dodecyl, 2-fluoroethyl 4-tolyl, 2-chloroethyl phenyl, benzyl 2-chloropropyl, biphenylyl ethyl, and 4-ethylphenyl n-hexyl 1,2-diphenyl-2-oxoethyl phosphate; the simple cycloaliphatic esters such as dicyclopentyl, dicyclohexyl and bis(2-methylcyclopentyl) 1,2-diphenyl-2-oxoethyl phosphate; bis(2-, 3- or 4-chlorocyclohexyl), bis(2-, 3- or 4-fluorocyclopentyl), and bis(3-chloro-4-methylcyclohexyl) 1,2-diphenyl-2-oxoethyl phosphate; mixed esters containing only one cycloaliphatic radical such as cyclohexyl ethyl, cyclopentyl phenyl, cyclohexyl 2-chloroethyl, benzyl cyclohexyl, 4-isopropylcyclohexyl 4-isopropylphenyl, and 2,4-dibromobenzyl 4-tolyl 1,2-diphenyl-2-oxoethyl phosphate.

Reaction of benzil with monobasic hydrocarbylphosphinates or the monobasic halohydrocarbylphosphinates proceeds as follows:

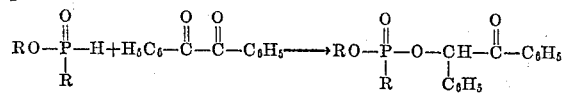

The products thus obtained are 1,2-diphenyl-2-oxoethyl esters of phosphonic acids. Thus, reaction of ethyl phenylphosphinate and benzil gives ethyl 1,2-diphenyl-2-oxoethyl phenylphosphonate, and reaction of 2,4-diclorophenyl n-butylphosphinate and benzil gives 2,4-dichlorophenyl 1,2-diphenyl-2-oxoethyl n-butylphosphonate. Examples of other compounds provided by the invention are shown in the table below:

$$RO-\overset{O}{\underset{R}{\overset{\|}{P}}}-O-\overset{C_6H_5}{\underset{}{CH}}-\overset{O}{\overset{\|}{C}}-C_6H_5$$

| RO= | R= |
|---|---|
| methyl | phenyl |
| ethyl | biphenylyl |
| trichlorobutyl | β-naphthyl |
| phenyl | phenyl |
| n-octyl | ethyl |
| tert-butyl | n-propyl |
| benzyl | benzyl |
| α-naphthyl | 2-chlorophenyl |
| biphenylyl | methyl |
| cyclohexyl | n-butyl |
| cyclopentyl | 4-tolyl |
| n-dodecyl | isopropyl |
| 4-bromophenyl | n-hexyl |
| n-hexyl | 4-iodobenzyl |
| n-heptyl | methyl |
| 2-iodophenyl | ethyl |
| 3-fluoropropyl | propyl |
| isopropyl | pentachlorophenyl |
| 4-methylcyclohexyl | tert-dodecyl |
| 4-n-pentylphenyl | phenyl |
| 2,4-dichlorophenyl | n-pentyl |
| 4-bromo-2-ethylphenyl | ethyl |
| n-decyl | cyclohexyl |
| branched chain nonyl | isobutyl |
| cyclopentyl | phenyl |
| n-undecyl | ethyl |
| pentachlorophenyl | biphenylyl |
| 2-chloropropyl | 2-chloropropyl |
| 2-phenylethyl | 2-fluoroethyl |
| 3,4-dichlorobenzyl | phenyl |
| 4-tolyl | 4-ethylphenyl |
| 2,4-xylyl | methyl |

The presently prepared 1,2-diphenyl-2-oxoethyl esters are disclosed in our copending application, Serial No. 765,696, filed September 26, 1958, wherein they are obtained by treating the 1:1 adduct of benzil and a trivalent phosphorus ester with a hydrogen donor. As shown in said copending application the oxo esters are stable, well characterized compounds which are useful as biological toxicants, gasoline additives and as flame-proofing agents for textiles and other fibrous materials and carbonaceous combustible materials generally, including synthetic resins and plastics. The present process provides an alternative route for preparing the 1,2-diphenyl-2-oxoethyl phosphorus esters from the pentavalent, rather than the trivalent, phosphorus esters and eliminates treatment with a hydrogen donor, as required when starting with the trivalent phosphorus esters.

As shown in our copending application, Serial No. 811,790, filed May 8, 1959, the reaction of aliphatic α-diketones and dibasic phosphonates or monobasic hydrocarbylphosphinates at a temperature of over 100° C. proceeds with the formation of a mixture of hydroxy oxo ester and a hydroxy-free oxo ester, thus:

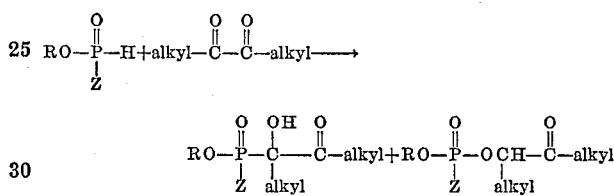

In order to obtain only the hydroxy-free oxo compound it is necessary to treat the above mixture with an inorganic alkali, whereby the content hydroxy oxo compound in the mixture is rearranged to the hydroxy-free ester. Surprisingly, when benzil is used instead of the aliphatic diketone, the alkali-catalyzed rearrangement is unnecessary because only the hydroxy-free compound is formed when benzil is heated with either the dibasic phosphonate or the monobasic phosphinate, at a temperature of over 100° C. and less than 200° C. Temperatures of from, say, 130° C. to 190° C. are preferred.

Since preparation of the 1,2-diphenyl-2-oxoethyl esters proceeds by addition of one mole of said phosphonate or phosphinate to one mole of the benzil, these reactants are advantageously employed in such stoichiometric proportion. However, since either the unreacted ketone or the unreacted phosphorus ester may readily be recovered from the final reaction product, an excess of either the benzil or the dibasic phosphonate or the monobasic phosphinate may be used. Such an excess may conveniently serve as diluent; however, no diluent need be employed. The reaction may also be effected in the presence of extraneous diluents or solvents. As will be appreciated by those skilled in the art, such diluents or solvents should have a boiling point which will permit operation at a temperature of over 100° C. Examples of presently useful liquids are, e.g., xylene, toluene, tetralin, etc. Use of higher temperatures, i.e., temperatures of, say, 130° C. generally serves to reduce the reaction time; hence, when a diluent is used it should advantageously have a boiling point and be employed in such a quantity that operation within 130° C. to 190° C. is permitted. Progress of the reaction is readily followed by noting cessation in change of viscosity, refractive index, etc. When no diluent is used and the reactants are present in the equimolar proportion, the product is the substantially pure 1,2-diphenyl-2-oxoethyl ester. When the reaction has been conducted in the presence of an inert solvent and/or an excess of one of the reactants, distillation of the reaction mixture is generally employed to give the substantially pure oxo ester. For many purposes, however, a crude reaction mixture comprising the oxo ester in the reaction diluent may be used directly, e.g., as gasoline additive or biological toxicant.

The invention is further illustrated by, but not limited to, the following examples.

Example 1

Diethyl phosphonate (69.1 g., 0.5 mole) and 84.0 g. (0.4 mole) of benzil were charged into a flask containing 100 ml. of dry toluene. This solution was heated to reflux (106° C.). In order to increase the temperature, enough toluene was distilled to raise the temperature to 150° C. The reaction mixture was maintained at this temperature for 1.5 hours. After removal of the solvent, distillation gave 13 g. (79% of the excess) of diethyl phosphonate, B.P. 50–60° C. (1.5 mm.), $n_D^{25}$ 1.4082 (lit. value 1.4076 corr.) and 135.2 g. (97% yield) of a tan viscous residue, $n_D^{25}$ 1.5422 (max. pot temp. 120° C./1.5 mm.). NMR indicated that the product contained only diethyl 1,2-diphenyl-2-oxoethyl phosphate and none of the isomeric diethyl α-benzoyl-α-hydroxybenzylphosphonate. Also, infrared failed to show the presence of any hydroxy group. Analysis of the product was as follows:

|           | Found | Calcd. for $C_{18}H_{21}O_5P$ |
|-----------|-------|-------------------------------|
| Percent C | 62.06 | 62.12 |
| Percent H | 5.93  | 6.07  |
| Percent P | 8.92  | 8.89  |

The reaction of bis(2-chloroethyl) phosphonate and benzil conducted as described above gives an excellent yield of bis(2-chloroethyl) 1,2-diphenyl-2-oxoethyl phosphate.

Example 2

A mixture consisting of 52.6 g. (0.25 mole) of benzil and 58.6 g. (0.25 mole) of diphenyl phosphonate was heated to a temperature of 166° C. within a time of 0.7 hour and then maintained at this temperature for an additional 0.3 hour. The product thus obtained comprised the substantially pure diphenyl 1,2-diphenyl-2-oxoethyl phosphate, $n_D^{25}$ 1.5968, which analyzed as follows:

|           | Found | Calcd. for $C_{26}H_{21}O_5P$ |
|-----------|-------|-------------------------------|
| Percent C | 70.68 | 70.52 |
| Percent H | 5.20  | 4.76  |
| Percent P | 6.83  | 6.97  |

The reaction of benzil with isopropyl 4-chlorophenylphosphinate conducted substantially as described above results in an excellent yield of isopropyl 1,2-diphenyl-2-oxoethyl 4-chlorophenylphosphonate.

What we claim is:

1. The method which comprises heating benzil, at a temperature of over 100° C. and less than 200° C., with an ester of the formula

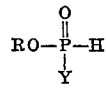

wherein R is selected from the class consisting of alkyl and aryl radicals of from 1 to 12 carbon atoms and Y is selected from the class consisting of R and —OR, and recovering from the resulting reaction product an oxo ester of the formula

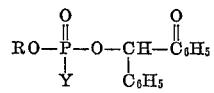

wherein R and Y are as herein defined.

2. The method which comprises heating benzil, at a temperature of over 100° C. and less than 200° C. and in the presence of an inert diluent, with an ester of the formula

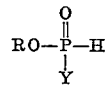

wherein R is selected from the class consisting of alkyl and aryl radicals of from 1 to 12 carbon atoms and Y is selected from the class consisting of R and —OR, and recovering from the resulting reaction product an oxo ester of the formula

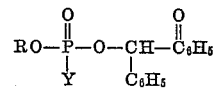

wherein R and Y are as herein defined.

3. The method of preparing a dialkyl 1,2-diphenyl-2-oxoethyl phosphate having from 1 to 12 carbon atoms in each alkyl radical which comprises heating benzil with a dialkyl phosphonate having from 1 to 12 carbon atoms in the alkyl radical, at a temperature of over 100° C. and less than 200° C.

4. The method of preparing a diaryl 1,2-diphenyl-2-oxoethyl phosphate having from 6 to 12 carbon atoms in each aryl radical which comprises heating benzil with a diaryl phosphonate having from 6 to 12 carbon atoms in each aryl radical at a temperature of over 100° C. and less than 200° C.

5. The method of preparing diethyl 1,2-diphenyl-2-oxoethyl phosphate which comprises heating benzil with diethyl phosphonate at a temperature of over 100° C. and less than 200° C.

6. The method of preparing diphenyl 1,2-diphenyl-2-oxoethyl phosphate which comprises heating benzil with diphenyl phosphonate at a temperature of over 100° C. and less than 200° C.

No references cited.